US010720028B1

(12) United States Patent
Lawrence

(10) Patent No.: US 10,720,028 B1
(45) Date of Patent: Jul. 21, 2020

(54) IOT COMPATIBLE ELECTRONIC DOOR CHIME

(71) Applicant: Nicor, Inc., Albuquerque, NM (US)

(72) Inventor: Rocklan E. Lawrence, Albuquerque, NM (US)

(73) Assignee: NICOR, INC., Albuquerque, NM (US)

( * ) Notice: Subject to any disclaimer, the term of this patent is extended or adjusted under 35 U.S.C. 154(b) by 0 days.

(21) Appl. No.: 16/354,763

(22) Filed: Mar. 15, 2019

(51) Int. Cl.
*G08B 3/10* (2006.01)

(52) U.S. Cl.
CPC ...................... *G08B 3/10* (2013.01)

(58) Field of Classification Search
CPC ... G08B 3/10; H02J 7/025; H02J 5/005; H02J 50/12; H04N 7/186
See application file for complete search history.

(56) References Cited

U.S. PATENT DOCUMENTS

| 5,894,262 A * | 4/1999 | McCavit | H02J 13/00 340/328 |
| 2007/0008077 A1* | 1/2007 | Claiborne | G08B 3/10 340/330 |
| 2007/0126574 A1* | 6/2007 | Langer | G08B 3/10 340/541 |
| 2010/0245060 A1* | 9/2010 | Tylicki | G08B 3/10 340/393.3 |
| 2014/0070922 A1* | 3/2014 | Davis | G08B 3/1016 340/6.1 |
| 2018/0308323 A1* | 10/2018 | Lee | G08B 3/10 |

FOREIGN PATENT DOCUMENTS

| CN | 303998536 S | 1/2017 |
| CN | 304004053 S | 1/2017 |
| CN | 304044124 S | 2/2017 |
| CN | 206657450 U | 11/2017 |

\* cited by examiner

*Primary Examiner* — Orlando Bousono
(74) *Attorney, Agent, or Firm* — Loza & Loza LLP; Richard H. Krukar

(57) ABSTRACT

An electronic door chime can meet safety standards and be compatible with smart doorbells and IOT doorbells. Current generation smart doorbells, also called IOT doorbells, require continuous power to drive the cameras, audio interfaces, and other components within the smart doorbell. Compatibility issues with prior art doorbell systems have emerged with the smart doorbell receiving inadequate power or power that doesn't meet the smart doorbell's input specification. In some cases, a prior art doorbell system is driven to failure or to excessive temperatures when the smart doorbell continuously draws too much power. A new electronic door chime can safely power the smart doorbells while also being compatible with simple push button doorbell devices.

20 Claims, 13 Drawing Sheets

US 10,720,028 B1

IOT COMPATIBLE ELECTRONIC DOOR CHIME

TECHNICAL FIELD

Embodiments are generally related to door chimes, electronic door chimes, consumer electronics, and the network connected devices.

BACKGROUND

Doorbells of a generation or two ago had a transformer, a switch (doorbell), and a sonic transducer (chime, ringer or buzzer). Closing the switch completed the circuit powering the sonic transducer. In the past, doorbells have been upgraded with electronic door chimes. Electronic door chimes can be powered, similar to the mechanical ringers of old, when the switch is closed and the electronic door chime receives power. An advantage of electronic door chimes is that they can generate more and different doorbell sounds and have been cost effective replacements for broken mechanical ringers. More recently, Internet of Things ("IOT") doorbells are gaining popularity.

IOT devices are internet connected sensors and actuators. An IOT doorbell can trigger a message to a person's smart phone or other internet connected device. Some IOT doorbells now include security cameras allowing a person to remotely monitor the happenings outside their door. As many people have discovered, these IOT doorbells are not always compatible with existing doorbells.

FIGS. 1-6, labeled as prior art, illustrate an electronic door chime that has enjoyed wide market acceptance and bears "UL" markings because it has been assessed as safe by UL, formerly Underwriters Laboratories. Those practiced in consumer electronics and product development know that an electronic door chime lacking UL certifications will not be approved for sale by most U.S. retailers or for installation by licensed contractors or home builders. UL 94 and UL 746 specify testing protocols and the classifications that may be applied to plastic materials.

UL 746 testing can establish "RTI" (Relative Temperature Index") ratings for materials. RTI is the maximum service temperature for a material where a class of critical properties will not be unacceptably compromised through chemical thermal degradation. This spans over the reasonable life of an electrical product relative to a reference material having a confirmed, acceptable corresponding performance-defined RTI. RTI electrical is electrical RTI and is associated with critical electrical insulating properties. RTI impact is mechanical impact RTI and is associated with critical impact resistance, resilience and flexibility properties. RTI strength is mechanical strength RTI or mechanical without impact and is associated with critical mechanical strength where impact resistance, resilience and flexibility are not essential. Those familiar with product certifications are familiar with RTI electrical, RTI impact, and RTI strength.

There are 12 UL 94 specified flame classifications assigned to materials based on the results of these small-scale flame tests. These classifications, listed in descending order for each of three groupings, distinguish a material's burning characteristics after test specimens have been exposed to a specified test flame under controlled laboratory conditions. The six of the classifications of interest here relate to materials commonly used in manufacturing enclosures, structural parts and insulators found in consumer electronic products (5VA, 5VB, V-0, V-1, V-2, HB). The classifications are listed in order from highest (most flame retardant) to lowest (least flame retardant) with 5VA higher than 5VB, 5VB higher then V-0, etc.

FIG. 1, labeled as prior art, illustrates an exploded view of an electronic door chime 101. The electronic door chime 101 can be installed in a two-gang dual voltage junction box 108. The sizes of junction boxes are often specified by the number of "gangs" which is the number of standard sized wired devices the box can accommodate. As electricians know, junction box sizes have standardized sizes as specified by the National Electric Code ("NEC"). A single gang junction box is approximately 2"×4" with varying depth. A dual voltage two-gang junction box has two single-gang sections and a solid wall between the two sections to thereby isolate one section from the other.

A back piece 107 has a first compartment 127 and a second compartment 128. When installed in the dual voltage junction box, the compartments are on different sides of the solid wall with the first compartment in one section and the second compartment in the other. A transformer 106 is held in the first compartment 127 by screws 111. A circuit board 105 is held in the second compartment by screws 110. A speaker 104 in the first compartment is electrically attached to the circuit board 105. A faceplate 102 is held to the back piece 107 by screws 112 that pass through spacers 114 and thread into the faceplate 102. The spacers 114 are molded into the back piece 107. The illustrated electronic door chime 101 can be wired to two doorbell buttons 109. Two two-wire busses 113 attach the doorbell buttons 109 to the electronic door chime 101. The electronic door chime 101 can produce one sound when one of the doorbell buttons 109 is pressed and a different sound when the other doorbell button 109 is pressed.

FIG. 2, labeled as prior art, illustrates a transformer 106 and circuit board 105 in an electronic door chime 101. The spacers 114 can be seen extending into the compartments 127, 128.

FIG. 3, labeled as prior art, illustrates the back of an electronic door chime 101. Mains electric power, the 120V AC at 60 Hz electric power available in most homes and businesses in the United States, passes into the electronic door chime 101 at the mains power input 116. The mains power input 116 is labeled N, G, and L to indicate which of the wires are neutral, ground, and live. Two doorbell interfaces 115 can be seen providing wiring points for the two-wires busses 113. The inner recesses of the standoffs are also visible.

FIG. 4, labeled as prior art, illustrates a cut view of the front grill of an electronic door chime 101. The faceplate 102 has a row of grooves 117 that can provide air flow into the electronic door chime 101. Baffles 118 at the inner surface help prevent intrusion.

FIG. 5, labeled as prior art, illustrates doorbell buttons 109 connected to an electronic door chime. A first two-wire bus 120 is connected to the "rear door" doorbell interface 115 and to a doorbell button 109. A second two-wire bus 121 is connected to the "front door" doorbell interface 115. Mains power wires 119 pass into the mains power input 116.

FIG. 6, labeled as prior art, illustrates doorbell buttons 109 and electronic door chimes 101 connected by two two-wire buses 121, 122. One of the doorbell buttons is directly electrically connected to the "rear door" doorbell interface 115 by a two-wire bus 120. The other doorbell button is directly electrically connected to the "front door" doorbell interface 115 by the other two-wire bus 121.

The electronic door chime 101 of FIGS. 1-6 is a commercially successful unit at least in part because it is one of the few such devices that has surpassed safety standards and carries UL safety markings. The current generation of IOT doorbells has proven incompatible with many installed mechanical door chimes and electronic door chimes. Systems and methods for electronic door chimes that are compatible with current generation IOT doorbells and that are certified as safe is needed.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is an aspect of the embodiments that an electronic door chime having a housing with a front cover attached to a back cover meets the safety standards required of consumer electronic devices in the United States ("U.S."). The housing is sized for installation in a two-gang dual voltage junction box having a wall separating one voltage section from the other voltage section to thereby form two single gang sections. The back cover has a first compartment and a second compartment with each compartment being sized to fit into a single gang section. A power supply inside the first compartment can be attached to the back cover. The power supply can be a transformer that receives mains electric power which is 120 VAC in the U.S. and that produces an AC output at 30 VA or more. The AC output can be at least 18 VAC and no more than 24 VAC. Testing has revealed that this size power supply can fit in the first compartment and can continuously power smart external doorbell devices such as Internet-Of-Things (IOT) doorbells having cameras, processors, and wireless connections.

The AC output is passed from the first compartment to a second compartment to power a first circuit. The first circuit can be attached to the back cover within the second compartment. The first circuit has a power section, a doorbell interface, a doorbell sensor, and a chiming circuit. The first circuit can play sounds on a speaker, also in the second compartment, that can be held between the first circuit and front cover by attaching the speaker to the front cover.

The power section receives the AC output and produces a first DC output and a second DC output. The first DC output and the second DC output can be at different voltages. The first DC output can supply power to a DC-DC converter or voltage regulator, thereby producing the second DC output. The first DC output can continuously power the doorbell sensor. In one non-limiting example, the first DC output continuously powers the output stages, including the output section of an optical isolator, of the doorbell sensor. The second DC output can continuously power the chiming circuit.

The doorbell interface can continuously provide doorbell power to an external doorbell device that produces a doorbell trigger signal when a doorbell button is actuated. The doorbell button can be a hardware or software button incorporated in a smart external doorbell device. Testing has shown that doorbell power of at least 18 VAC and at 30VA or more can successfully and continuously power the available smart external doorbell devices. The doorbell power should be fused or current limited, perhaps by a fuse or current limiting resistor in an input section of the doorbell sensor. The doorbell sensor produces a doorbell sensed signal upon receiving the doorbell trigger signal from the external doorbell device. The doorbell sensed signal can cause the chiming circuit to send a sound signal to the speaker which then produces a sound. The chiming circuit can be a semiconductor chip configured specifically for producing a sound signal upon receiving a signal on an input. Existing semiconductor chips can directly drive a speaker and cause it to produce one sound when one input line is triggered and to produce a different sound when a different input pin line is triggered.

The doorbell trigger signal can be a DC signal, an AC signal, or a rectified AC signal. The trigger sensed signal can therefore be isolated from the doorbell trigger signal. An optical isolator can isolate the trigger sensed signal from the doorbell trigger signal. The optical isolator input can be powered by the doorbell power and the optical isolator output can be powered by the first or second DC output. In practice, an optoisolator can be considered to have a light emitting diode ("LED") as an input stage and a transistor without a gate wire as an output stage. Passing current through the LED illuminates the transistor's gate, thereby driving it from nonconducting to conducting. In this manner the input is optically isolated from the output.

A faceplate can be attached to the front cover and configured to cover the electronic door chime when the housing is installed in the dual voltage box. The faceplate should allow air to circulate into and through the housing.

A simple external doorbell device, other than the tested smart external doorbell devices, can have a rectifier, a switch, and a light emitting diode ("LED"). The doorbell power can be rectified by the rectifier before being used to light the LED. The switch can be a single pole single throw switch that is normally open. The switch can be the doorbell button or can be closed when the doorbell button is pressed. Closing the switch causes the doorbell trigger signal to be communicated to the doorbell sensor. A two-wire bus can carry doorbell power to the external doorbell device and can carry the doorbell trigger signal to the electronic door chime.

Multiple electronic door chimes can be attached to the same two-wire bus. All of the electronic door chimes can thereby receive the same doorbell trigger signal and be activated by the same doorbell trigger signal. Upon being activated by a doorbell trigger signal the triggered electronic door chime produces sounds.

As discussed above, electronic door chimes must be safe. They must be safe to install and they must remain safe after installation. The electronic door chimes must thereby satisfy certain requirements. It is for this reason that the power supply, attached to mains electric power, is physically separated from the first circuit that operates at a lesser voltage. The power supply and the first circuit are in separate compartments. Once installed, the power supply and the first circuit are further isolated by the wall separating one gang of the dual voltage junction box from the other gang. The materials and material thickness forming the front cover and the back cover are also selected to ensure safety.

One nonlimiting embodiment has the back cover and the front cover being Acrylonitrile Butadiene Styrene ("ABS") and having a minimum thickness of 2.2 mm. A 1.5 mm thickness of the ABS has a UL 94 flame rating of at least V-0, a UL 746 RTI Electric rating of at least 80° C., a UL 746 RTI Impact rating of at least 80° C., and a UL 746 RTI Strength rating of at least 80° C.

Another nonlimiting embodiment has the back cover and the front cover being a Polycarbonate/Acrylonitrile Butadiene Styrene alloy ("PC/ABS") and having a minimum thickness of 2.2 mm. A 1.7 mm thickness of the PC/ABS has a UL 94 flame rating of at least V-2, a UL 746 RTI Electric rating of at least 60° C., a UL 746 RTI Impact rating of at least 60° C., and a UL 746 RTI Strength rating of at least 60° C. Note that higher temperatures indicate higher ratings.

The electronic door chime described here is advantageous because it is compatible with smart external doorbell devices, because it is cost-effective, and because it is safe for installation in existing structures and in new construction. It is through careful engineering and material selection as confirmed by testing that this safe, functional, and cost-effective electronic doorbell chime has been developed.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention. The illustrated examples are nonlimiting and not necessarily to scale.

DETAILED DESCRIPTION

Figure 1:
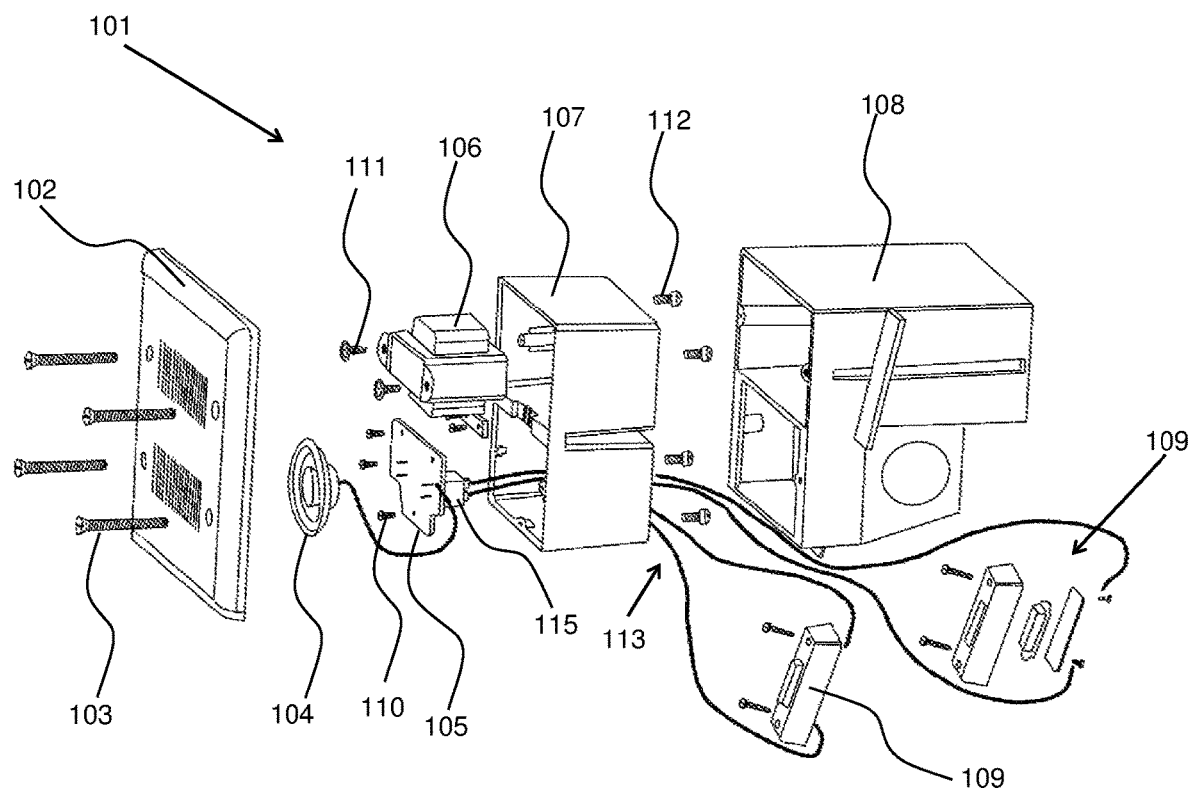
FIG. 1, labeled as prior art, illustrates an exploded view of an electronic door chime.
Figure 2:
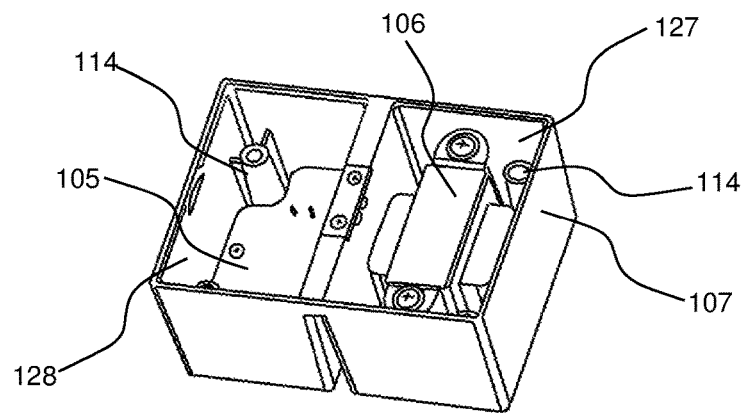
FIG. 2, labeled as prior art, illustrates a transformer and circuit board in an electronic door chime.
Figure 3:
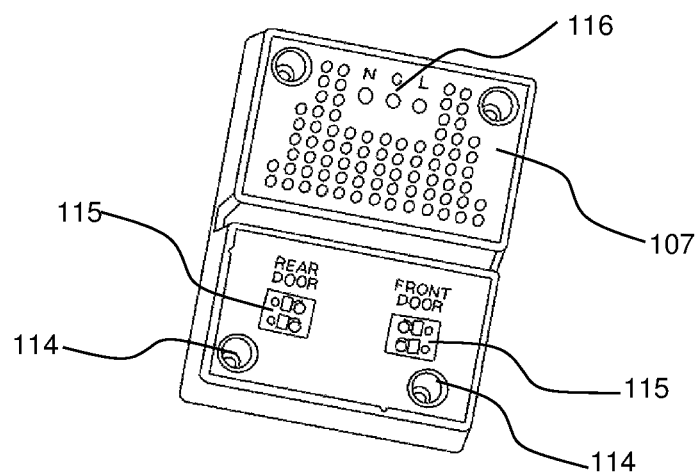
FIG. 3, labeled as prior art, illustrates the back of an electronic door chime.
Figure 4:
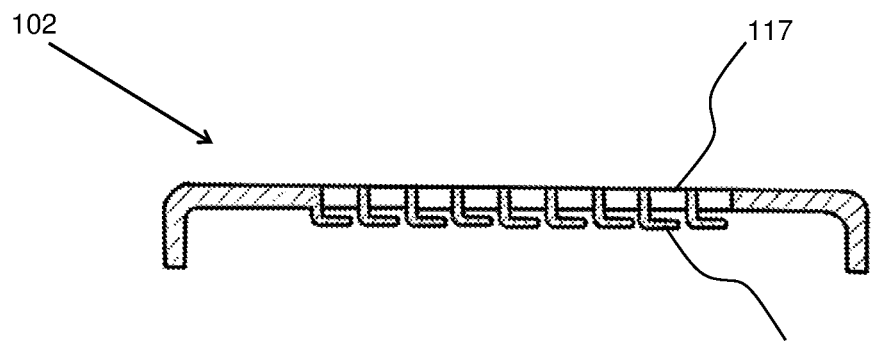
FIG. 4, labeled as prior art, illustrates a cut view of the front grill of an electronic door chime.
Figure 5:
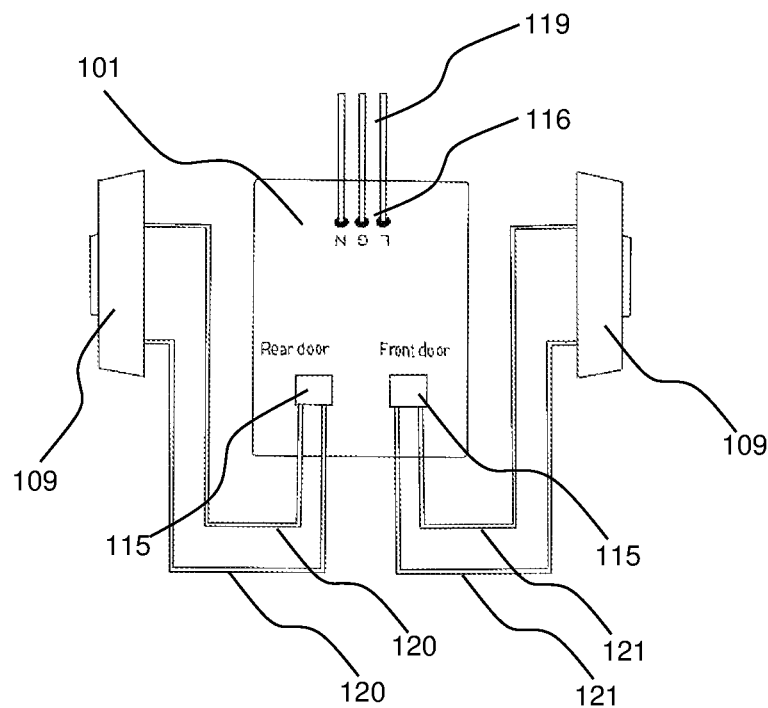
FIG. 5, labeled as prior art, illustrates doorbell buttons connected to an electronic door chime.
Figure 6:
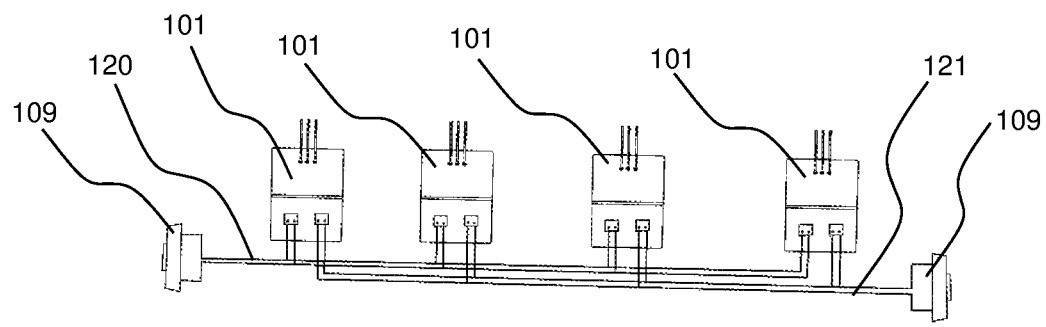
FIG. 6, labeled as prior art, illustrates doorbell buttons and electronic door chimes connected by two two-wire buses.

The particular values and configurations discussed in these non-limiting examples can be varied and are cited merely to illustrate at least one embodiment and are not intended to limit the scope thereof.

For a general understanding of the present disclosure, reference is made to the drawings. In the drawings, like reference numerals have been used throughout to designate identical elements.

Figure 7:
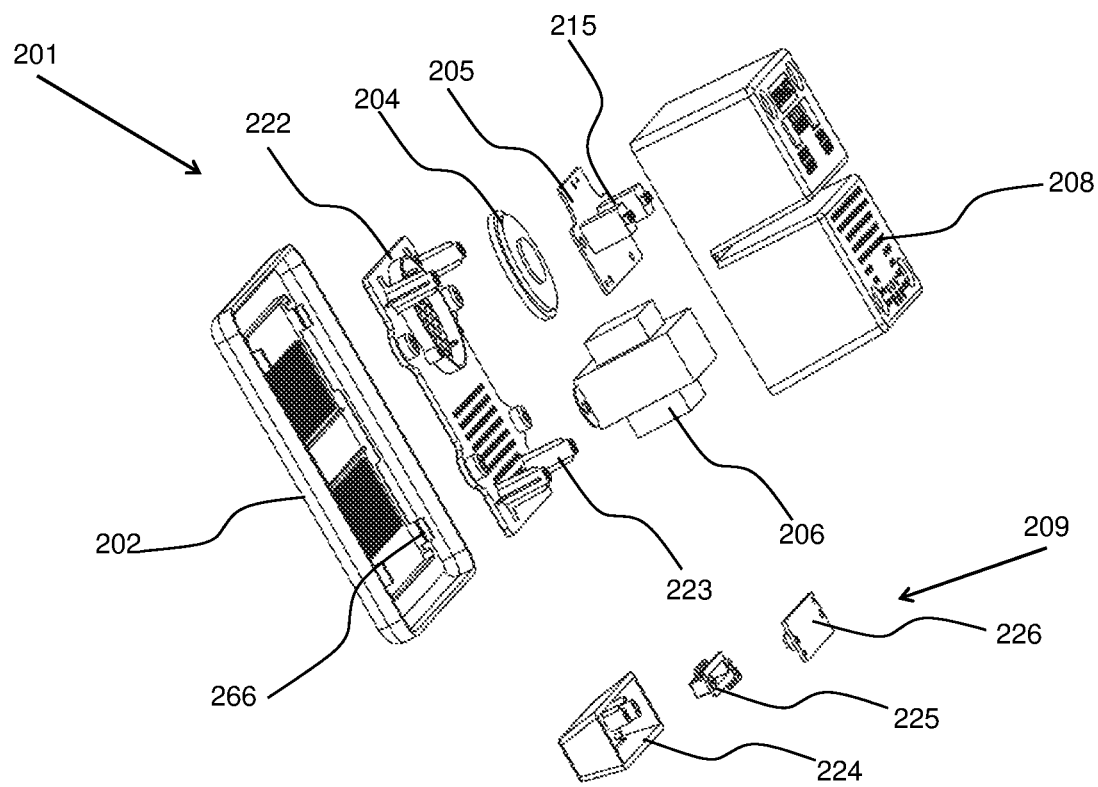
FIG. 7 is an exploded view of an electronic door chime in accordance with aspects of the embodiments.
Figure 8:
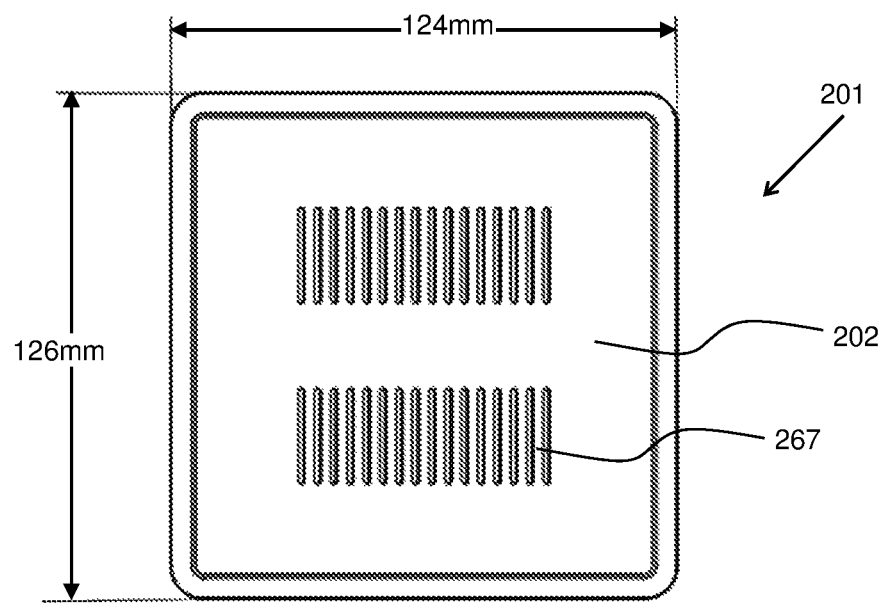
FIG. 8 is a top view of an electronic door chime in accordance with aspects of the embodiments.
Figure 9:
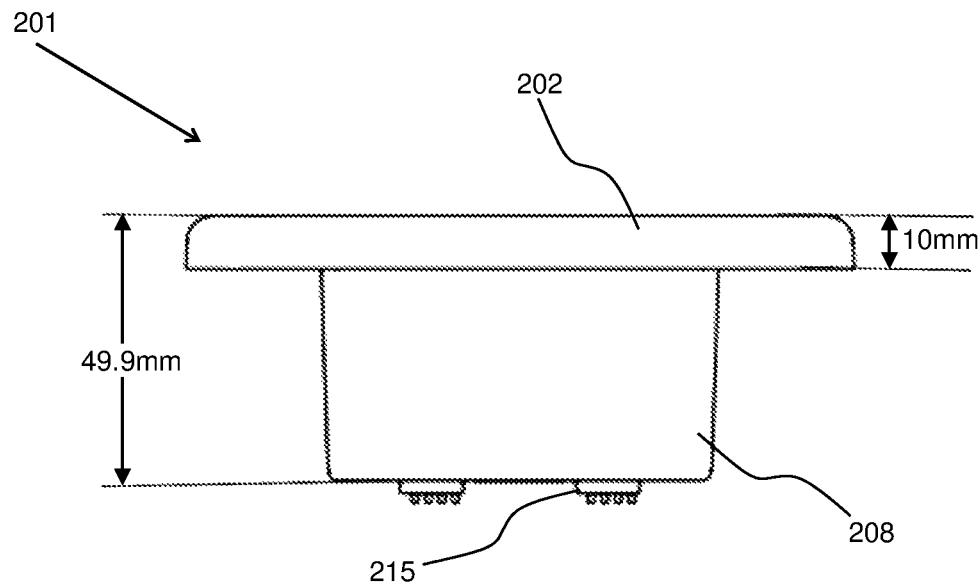
FIG. 9 is a side view of an electronic door chime in accordance with aspects of the embodiments.
Figure 10:
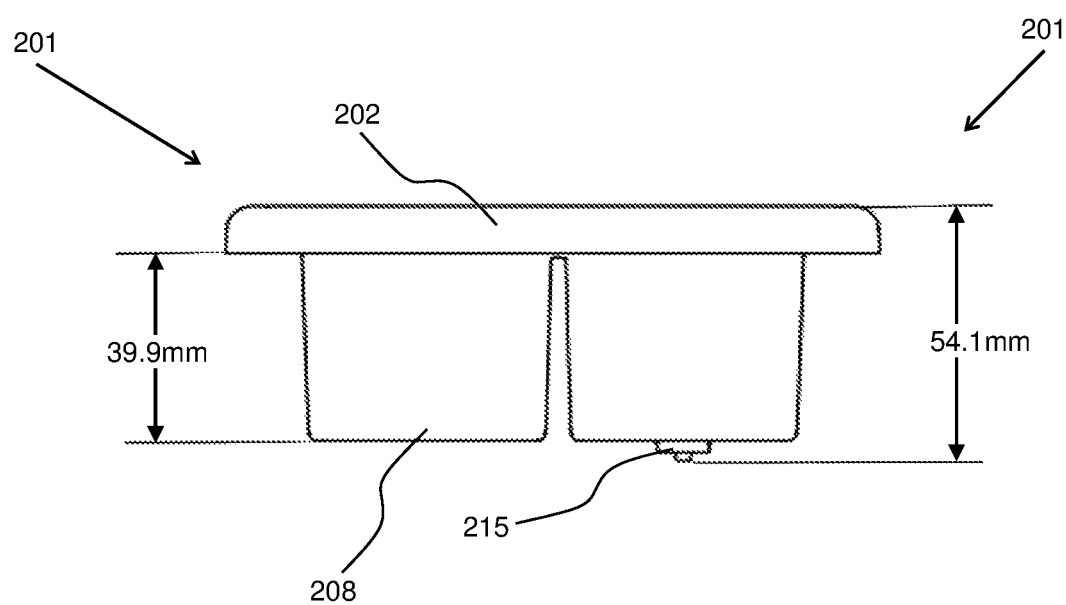
FIG. 10 is another side view of an electronic door chime in accordance with aspects of the embodiments.

FIG. 7 illustrates an exploded view of an electronic door chime 201 in accordance with aspects of the embodiments. FIGS. 8-10 also provide views of the electronic door chime of FIG. 7. The back cover 208 has two compartments, a first compartment 227 and a second compartment 228. A transformer 206 is installed in the first compartment 227. Screws can attach the transformer 206 to transformer standoffs 233 molded into the back cover 208. A first circuit 205 is installed in the second compartment 228. Screws can attach the first circuit 205 to circuit standoffs 234 molded into the back cover 208. A speaker 204 can be attached to a speaker mount 231 molded into the front cover 222. Screws can attach the speaker to speaker mounting holes 280. The front cover 222 can be attached to the back cover 208, covering the first compartment 227 and the second compartment 228. Front cover standoffs 223 are molded into the front cover 222. Back cover standoffs 232 are molded into the back cover 208. Screws in the back cover standoffs 232 can pull the front cover standoffs 223 against the back cover standoffs 232, thereby attaching the front cover 222 to the back cover 208. The first circuit's 205 doorbell interfaces 215 can extend out of windows in the back cover 208 when the first circuit 205 is installed.

An external doorbell device 209 has a doorbell cover 224, a button 225, and a doorbell circuit 265. The electronic door chime 201 has been designed for use with smart external doorbell devices. The external doorbell device 209 is a simple device that is also compatible with the electronic door chime 201.

FIG. 8 is a top view of the electronic door chime 201 of FIGS. 7-10 in accordance with aspects of the embodiments. The faceplate 202 can be seen to be sized to cover a two-gang junction box such as two-gang dual voltage junction box 108. The faceplate 202 removably attaches to the front cover 222 by clips 266 that can be seen in FIG. 7. The faceplate 202 has slots 267 allowing airflow into and through the electronic door chime 201. For safety the two-gang dual voltage junction box 108 should be a UL certified two-gang dual voltage box.

FIGS. 9 and 10 are side views of the electronic door chime 201 of FIGS. 7-10 in accordance with aspects of the embodiments. The faceplate 202 is installed and the back cover 208 can be seen. A doorbell interface 215 can be seen extending through windows in the back cover 208. The 49.9 mm depth provides for installing the electronic door chime into a dual voltage junction box such as dual voltage junction box 108. The top section of dual voltage junction box 108 is closed on five sides and has a depth larger than 45 mm.

Figure 11:
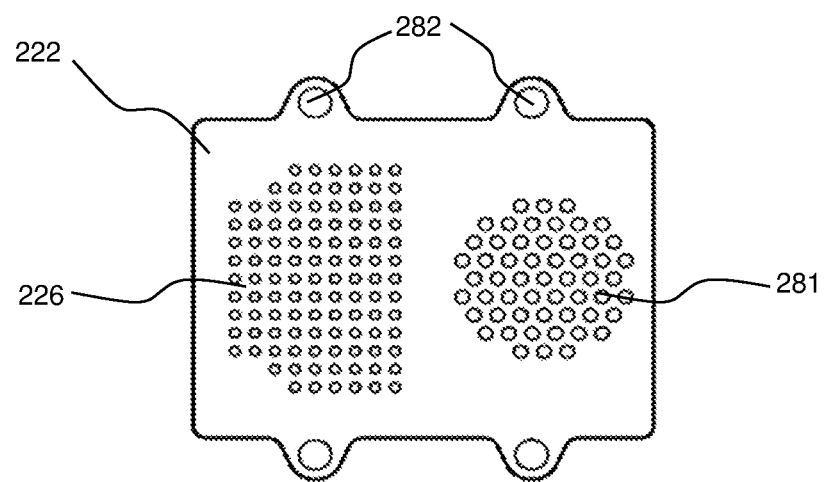
FIG. 11 illustrates the front side of a front cover of an electronic door chime in accordance with aspects of the embodiments.
Figure 12:
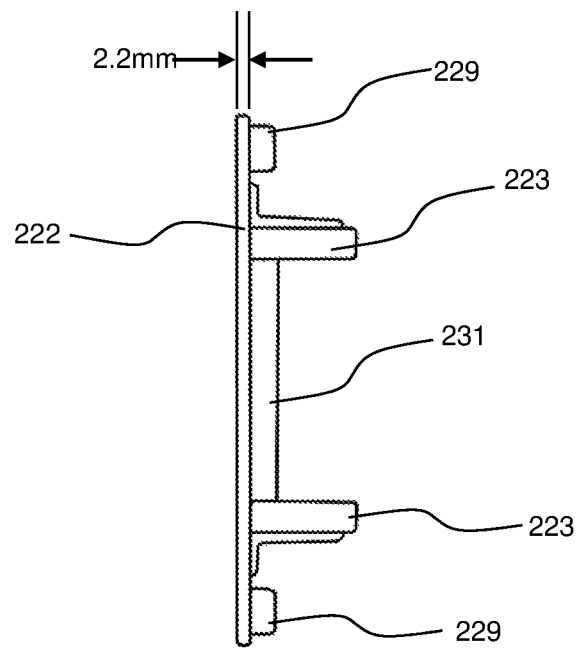
FIG. 12 illustrates a side view of a front cover of an electronic door chime in accordance with aspects of the embodiments.
Figure 13:
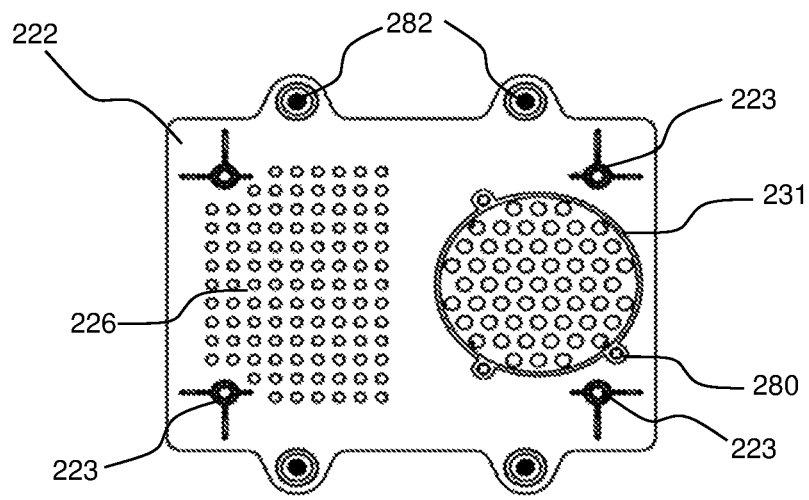
FIG. 13 illustrates the back side of a front cover of an electronic door chime in accordance with aspects of the embodiments.
Figure 14:
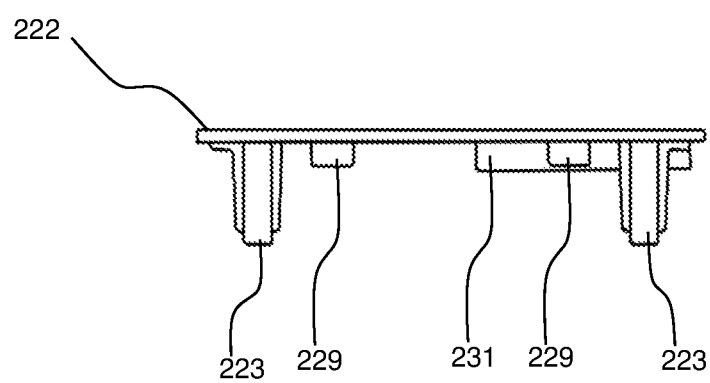
FIG. 14 illustrates another side view of a front cover of an electronic door chime in accordance with aspects of the embodiments.

FIGS. 11-14 illustrate views of the front cover 222 of the electronic door chime 201 of FIGS. 7-10 in accordance with aspects of the embodiments. FIG. 11 illustrates the front side of the front cover 222. FIG. 12 illustrates a side view of the front cover 222. FIG. 13 illustrates the back side of the front cover 222. FIG. 14 illustrates another side view of the front cover 222. Air holes 226 provide paths for air to circulate to the power supply 206. Sound holes 281 are positioned to be in front of the speaker 204. The electronic door chime 201 can be attached to the dual voltage junction box 108 by screws passing through mounting holes 282. The mounting holes 282 pass through junction box spacers 229 molded into the front cover 222. The side of the speaker mount 231 can be seen in FIGS. 12 and 14. The front cover standoffs 223 are also molded into the front cover 222. The front cover is illustrated as 2.2 mm thick because testing has revealed that electronic door chimes can be certified as safe when the front cover is 2.2 mm thick and formed from ABS and PC/ABS having properties as discussed above.

Figure 15:
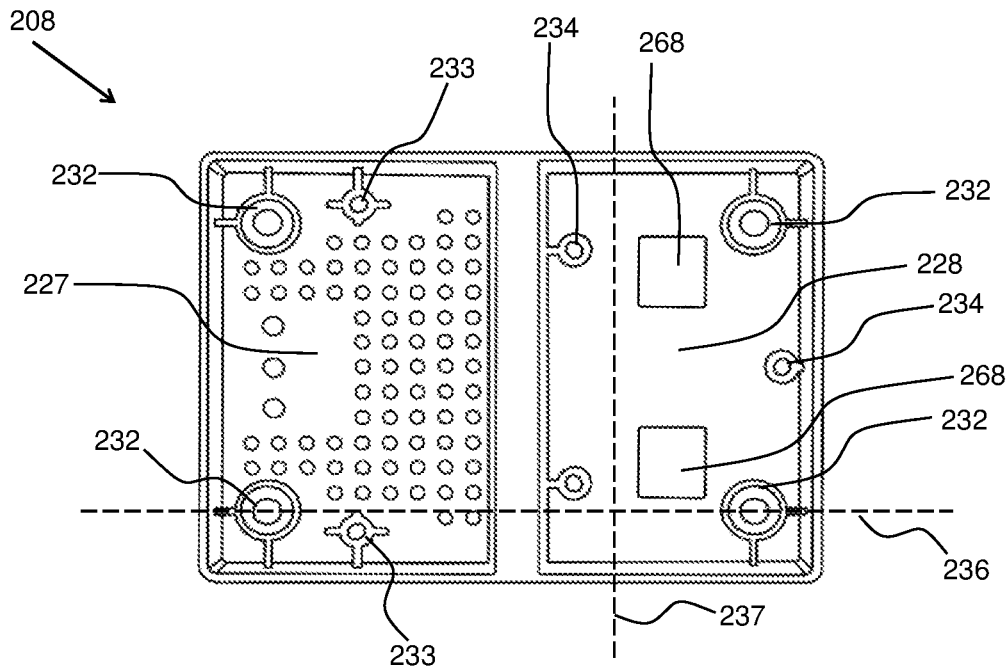
FIG. 15 illustrates a back cover of an electronic door chime viewed from the front in accordance with aspects of the embodiments.
Figure 16:
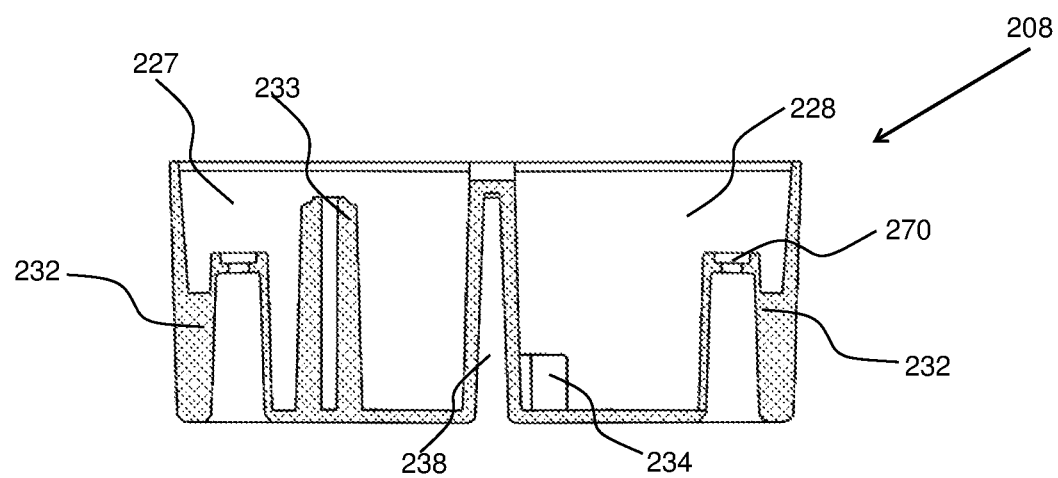
FIG. 16 illustrates a cut view of a back cover of an electronic door chime in accordance with aspects of the embodiments.
Figure 17:
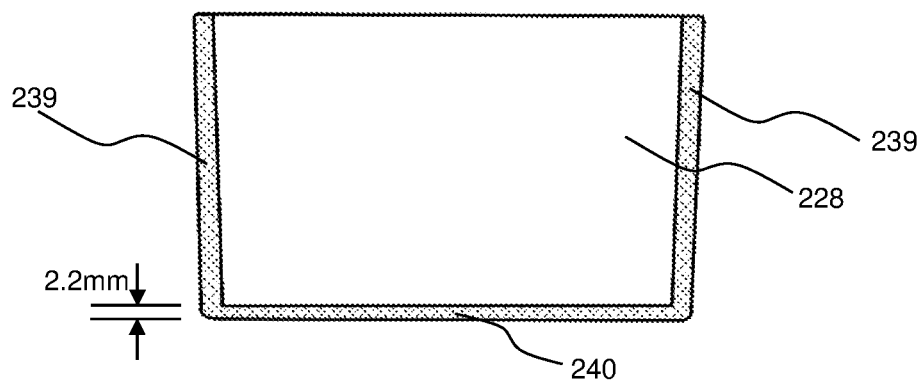
FIG. 17 illustrates another cut view of a back cover of an electronic door chime in accordance with aspects of the embodiments.
Figure 18:
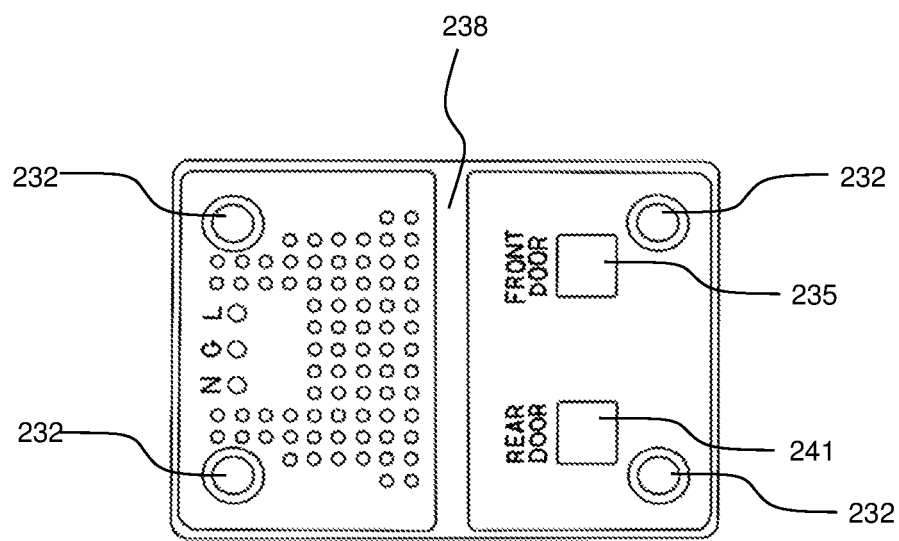
FIG. 18 illustrates a back cover of an electronic door chime viewed from the rear in accordance with aspects of the embodiments.

FIGS. 15-18 illustrate views of the back cover of the electronic door chime 201 of FIGS. 7-10 in accordance with aspects of the embodiments. FIG. 15 illustrates the back cover 208 viewed from the front such that the insides of the first compartment 227 and the second compartment 228 are visible. FIG. 16 illustrates a cut view of the back cover 208 along cut line 236 seen in FIG. 15. FIG. 17 illustrates another cut view of the back cover 208 along cut line 237 seen in FIG. 15. FIG. 18 illustrates the back cover 208 viewed from the rear.

Back cover standoffs 232 can be seen molded into the first compartment 227 and second compartment 228. The first compartment, in this embodiment configured for transformer 206, has molded in transformer standoffs 233 and numerous air holes. The second compartment 228, in this embodiment configured for the first circuit 205, has molded in circuit standoffs 234 and windows 268 through which doorbell interfaces 215 can extend. The back wall 240 and sidewalls 239 of the back cover 208 are shown to be 2.2 mm thick. As with the front cover 222, a thickness of 2.2 mm has been confirmed through testing to provide a safe electronic door chime when formed of the ABS and PC/ABS materials discussed above. The ends of the front cover standoffs 223 can fit into indents 270 in the back cover standoffs 232 to help with alignment during assembly and to strengthen to connection between the front cover standoffs 223 and the back cover standoffs 232.

Figure 19:
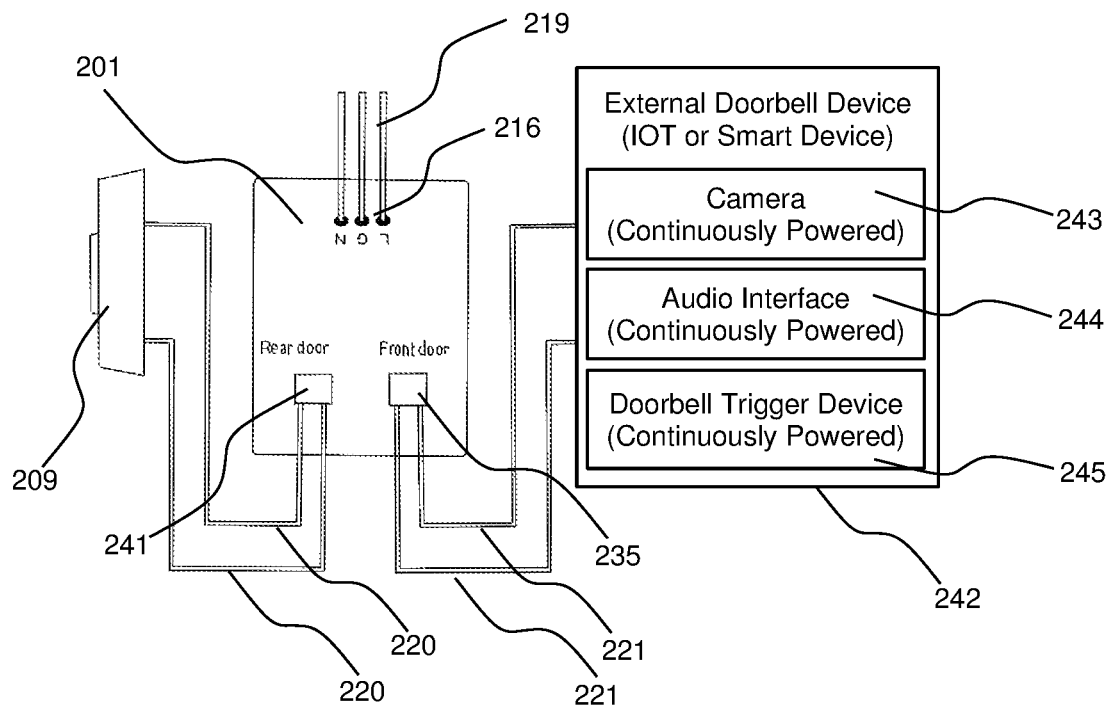
FIG. 19 illustrates an electronic door chime connected to a simple external doorbell device and to a smart external doorbell device in accordance with aspects of the embodiments.

FIG. 19 illustrates an electronic door chime 201 connected to a simple external doorbell device 209 and to a smart external doorbell device 242 or IOT enabled external doorbell device 242 in accordance with aspects of the embodiments. A first two-wire bus 221 connects a first doorbell interface 235 to a smart external doorbell device 242. The nonlimiting smart external doorbell device 242 has a camera 243, audio interface 244 and doorbell trigger device 245. Here, the camera 243, audio interface 244 and doorbell trigger device 245 are all continuously powered. The doorbell trigger device 245 can therefore be a capacitive sensor, a software implemented button on a graphical user interface, etc. Smart external doorbell devices, particularly IOT doorbells, commonly have wireless communications interfaces for connection to the internet.

A simple external doorbell device 209 is connected by a second two-wire bus 220 to a second doorbell interface 241. The electronic door chime 201 is powered by mains electric power 219 (e.g. 120 VAC) arriving at a mains power interface 216.

Figure 20:
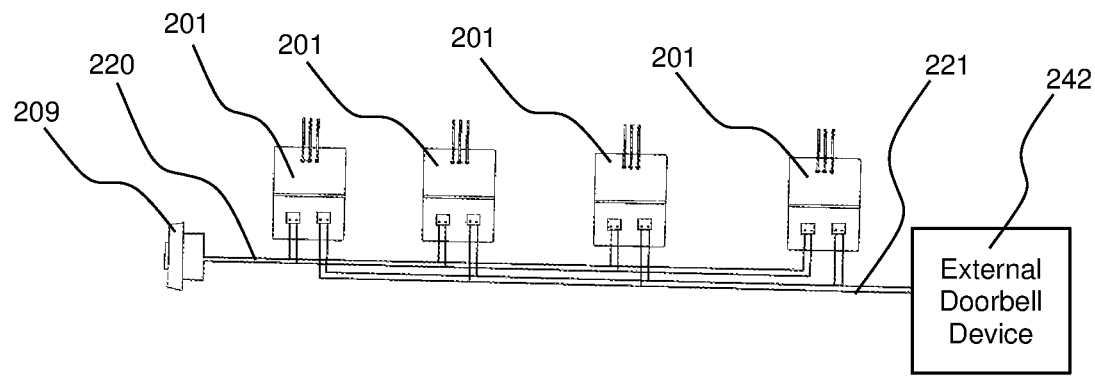
FIG. 20 illustrates multiple electronic door chimes connected to external doorbell devices by two-wire busses in accordance with aspects of the embodiments.

FIG. 20 illustrates multiple electronic door chimes 201 connected to external doorbell devices 209, 242 by two-wire busses 220, 221 in accordance with aspects of the embodiments. The multiple electronic chimes 201, including a first electronic door chime 201, a second electronic door chime 201, a third electronic door chime 201, and a fourth electronic door chime 201, can all be identical. The two-wire buses carry doorbell power and doorbell trigger signals. As such, each two-wire bus provides direct electrical connection between multiple doorbell interfaces and an external doorbell device. A first two-wire bus 221 connects a smart external doorbell device 242 to four electronic door chimes 201. A second two-wire bus 220 connects a simple external doorbell device 209 to four electronic door chimes 201.

Figure 21:
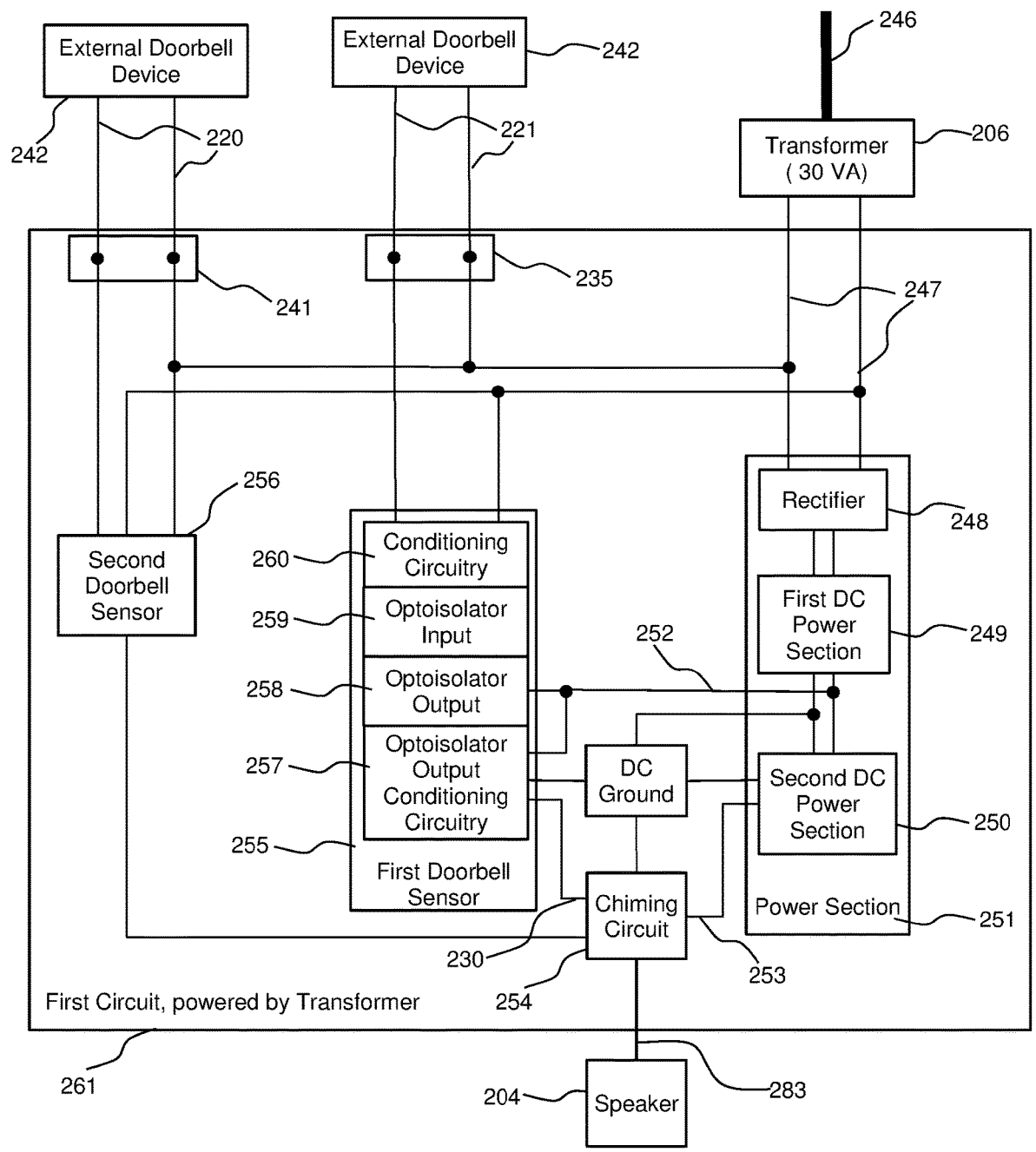
FIG. 21 illustrates a first circuit for an electronic door chime in accordance with aspects of the embodiments.

FIG. 21 illustrates a first circuit 261 for an electronic door chime 201 in accordance with aspects of the embodiments. The transformer 206 is connected to mains electric power 246 and produces an AC output 247. The power section 251 receives the AC power 247 and passes it through a rectifier 248, producing a rectified output. The rectified output is passed to a first DC power section 249 that produces a first DC voltage 252. The first DC voltage powers a second DC power section 250 that produces a second DC voltage 253. The second DC power section can include a DC-DC converter. One leg of the AC output is connected directly to the doorbell interfaces 235, 241. The second leg of the AC output passes to conditioning circuitry 260 of doorbell sensors 255, 256 where it can be current limited or fused and passed to the doorbell interface 235, 241. The doorbell power is thereby produced from the AC output. Note that the second doorbell sensor 256 can be identical to the first doorbell sensor 255. When the doorbell trigger signal is received, the conditioning circuitry 260 can pass enough current through an optoisolator input 259 that the optoisolator output 258 is activated (e.g. allows current to flow). The first DC voltage can power the optoisolator output 258 and the optoisolator output conditioning circuitry 257. The optoisolator output conditioning circuitry 257 can produce a trigger sensed signal 230 when the optoisolator output 258 is activated, thereby sending the trigger sensed signal to the chiming circuit 254. Upon receiving the trigger sensed signal 230, the chiming circuit 254 can send a sound signal 283 to speaker 204, thereby causing the speaker 204 to produce a sound. The sound can be produced from a recorded sound and can alert a person (or dog) that the someone is ringing the bell.

Figure 22:
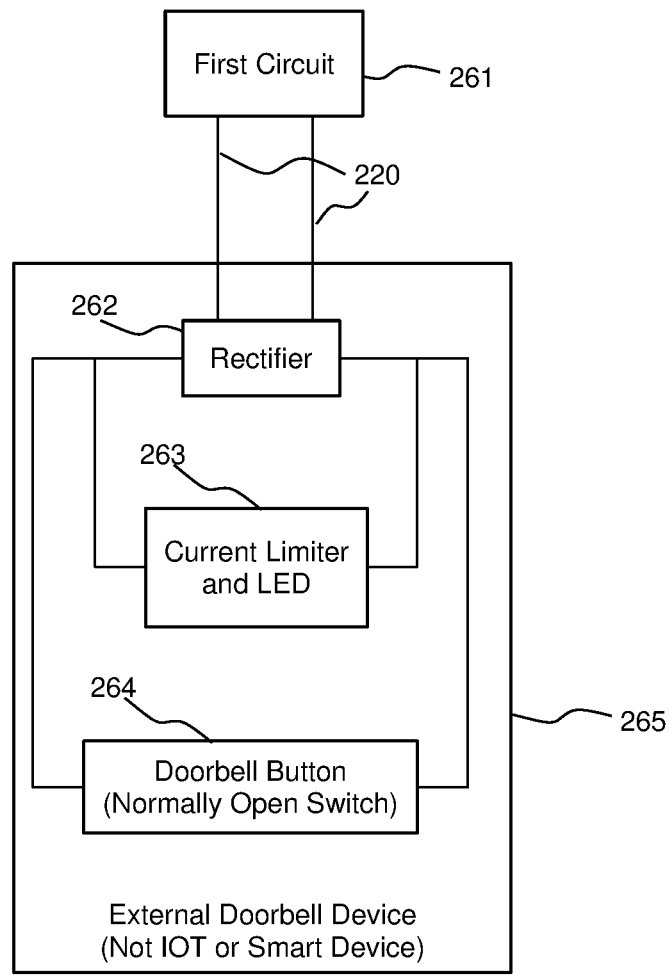
FIG. 22 illustrates an external doorbell device that is compatible with an electronic door chime in accordance with aspects of the embodiments.

FIG. 22 illustrates an external doorbell device 265 that is compatible with an electronic door chime 201 in accordance with aspects of the embodiments. The first circuit 261 can be connected to the external doorbell device 265 by a two-wire bus 220. The two-wire bus is carrying doorbell power which is no less than 18 VAC, no greater than 24 VAC, and at the same frequency as mains electric power, likely 60 Hz. Doorbell power is rectified by rectifier 262 and, when switch 264 is open, passes through current limiter and LED 263. The LED lights up, providing an illuminated doorbell. When doorbell button 264 is pressed, closing the switch, current stops flowing through the LED because the current instead flows through the switch. As such, the LED is configured to light only when the switch is open. The current flowing through the switch 264 is not current limited at the external doorbell device 265. As such, the current passing through the external doorbell device 265 is sufficient for the optoisolator input 259 to drive the optoisolator output 258 into conduction. The doorbell trigger sensed signal is thereby generated.

Figure 23:
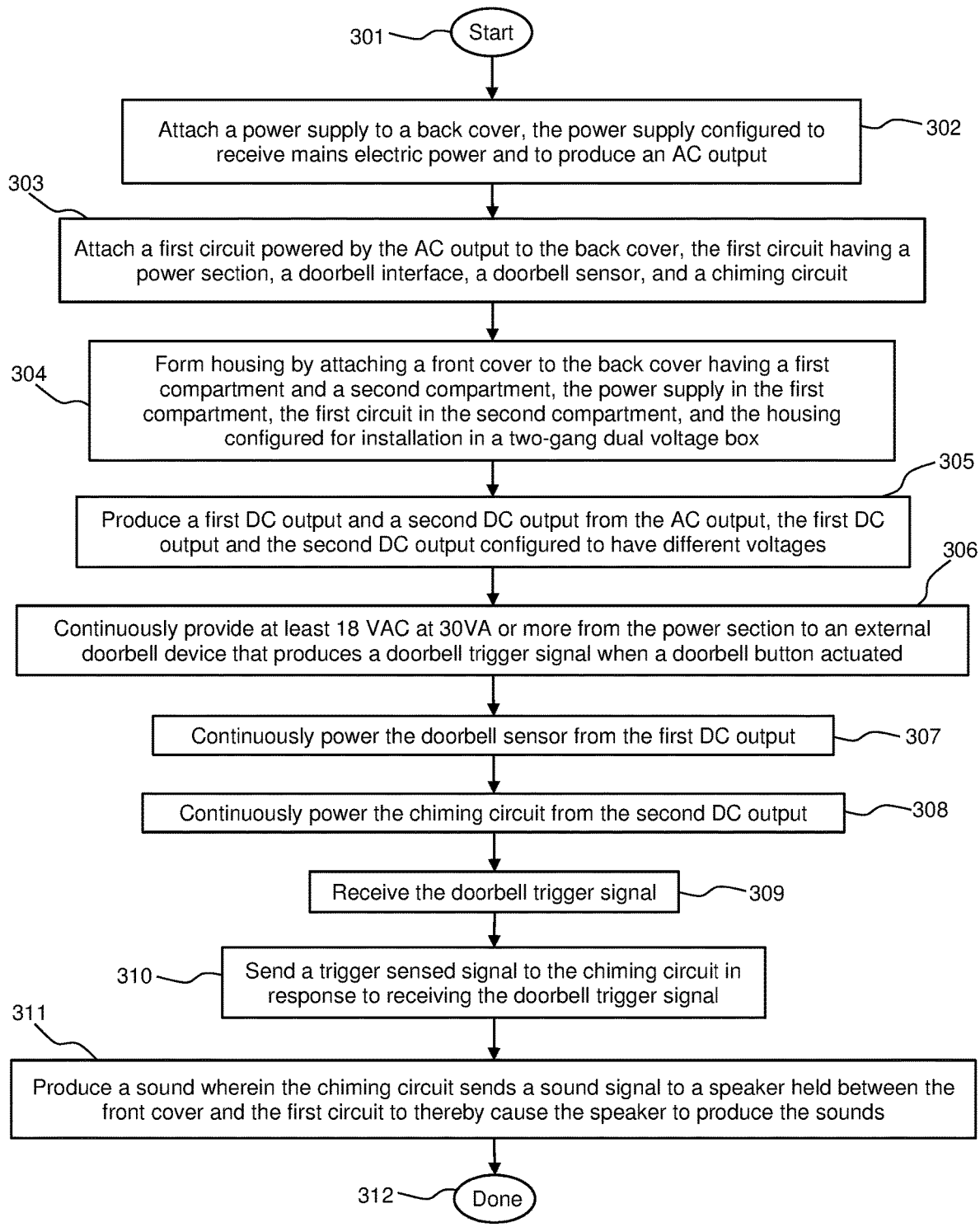
FIG. 23 illustrates a high-level flow diagram of assembling and using an electronic door chime in accordance with aspects of the embodiments.

FIG. 23 illustrates a high-level flow diagram of assembling and using an electronic door chime in accordance with aspects of the embodiments. The method of FIG. 23 can configure and use an electronic door chime. After the start 301, a power supply is attached to the back cover 302. The power supply receives mains electric power and produces AC output. The first circuit is attached to the back cover where it is powered by the AC output 303. The first circuit has a power section, a doorbell interface, a doorbell sensor, and a chiming circuit. A housing is formed by attaching the front cover to the back cover 304. The back cover has a first compartment and a second compartment. The power supply is in the first compartment and the first circuit is in the second compartment. The housing is configured for installation in a two-gang dual voltage box. A first DC output and a second DC output are produced from the AC output 305. The first DC output and the second DC output are at different voltages. An external doorbell device is continuously provided, from the power section, with at least 18 VAC at 30VA or more 306. The external doorbell device produces a doorbell trigger signal when a doorbell button is actuated. The doorbell sensor is continuously powered by the first DC output 307. The chiming circuit is continuously powered from the second DC output 308. In response to receiving the doorbell trigger signal 309, a trigger sensed signal is sent to the chiming circuit 310. An audible sound is produced by a speaker connected to the chiming circuit 311 because the chiming circuit sends a sound signal to the speaker in response to receiving the trigger sensed signal before being done 312.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An electronic door chime comprising:
a back cover comprising a first compartment and a second compartment;
a front cover attached to the back cover to thereby form a housing configured for installation in a dual voltage box;
a power supply attached to the back cover and in the first compartment, the power supply configured to receive mains electric power and to produce an AC output of at least 18 VAC at 30 VA or more;
a first circuit powered by the AC output, attached to the back cover and in the second compartment, the first circuit comprising a power section, a doorbell interface, a doorbell sensor, and a chiming circuit; and
a speaker held between the front cover and the first circuit;
wherein the power section receives the AC output and produces a first DC output and a second DC output;
wherein the doorbell interface is configured to continuously provide doorbell power to an external doorbell device that produces a doorbell trigger signal when a doorbell button is actuated, the doorbell power being at least 18 VAC at 30VA or more;
wherein the doorbell sensor is configured to receive the doorbell trigger signal and to produce a trigger sensed signal upon receiving the doorbell trigger signal;
wherein the doorbell sensor is continuously powered by the first DC output;
wherein the chiming circuit is continuously powered by the second DC output; and
wherein the chiming circuit sends a sound signal to the speaker upon receiving the trigger sensed signal to thereby cause the speaker to produce a sound.

2. The electronic door chime of claim 1 wherein the dual voltage box is a two-gang dual voltage box.

3. The electronic door chime of claim 1 wherein the doorbell power is no more than 24 VAC.

4. The electronic door chime of claim 1 wherein the power supply is a transformer configured to provide no more than 24 VAC.

5. The electronic door chime of claim 1 wherein the first DC output has a first DC voltage, wherein the second DC output has a second DC voltage, and wherein the first DC voltage is configured to be different from the second DC voltage.

6. The electronic door chime of claim 1 wherein the trigger sensed signal is optically isolated from the doorbell trigger signal.

7. The electronic door chime of claim 1 further comprising a faceplate attached to the front cover and configured to cover the electronic door chime when the housing is installed in the dual voltage box.

8. The electronic door chime of claim 1 further comprising the external doorbell device, the external doorbell device comprising a rectifier, a switch, and a light emitting diode configured to light only when the switch is open.

9. The electronic door chime of claim 1 further comprising:
a second electronic door chime identical to the electronic door chime;
wherein the electronic door chime, the second electronic door chime, and the external doorbell device are directly electrically connected by a two-wire bus that carries the doorbell power and the doorbell trigger signal, wherein the electronic door chime and the second electronic door chime are activated by the same doorbell trigger signal.

10. The electronic door chime of claim 1, the back cover and the front cover being Acrylonitrile Butadiene Styrene and having a minimum thickness of 2.2 mm, wherein a 1.5 mm thickness of the Acrylonitrile Butadiene Styrene has a UL 94 flame rating of at least V-0, a UL 746 RTI Electric rating of at least 80° C., a UL 746 RTI Impact rating of at least 80° C., and a UL 746 RTI Strength rating of at least 80° C.

11. The electronic door chime of claim 1, the back cover and the front cover being a Polycarbonate/Acrylonitrile Butadiene Styrene alloy and having a minimum thickness of 2.2 mm, wherein a 1.7 mm thickness of the Polycarbonate/Acrylonitrile Butadiene Styrene alloy has a UL 94 flame rating of at least V-2, a UL 746 RTI Electric rating of at least 60° C., a UL 746 RTI Impact rating of at least 60° C., and a UL 746 RTI Strength rating of at least 60° C.

12. The electronic door chime of claim 1 further comprising:
a faceplate attached to the front cover and configured to cover the electronic door chime when the housing is installed in the dual voltage box;

the external doorbell device, the external doorbell device comprising a rectifier, a switch, and a light emitting diode configured to light only when the switch is open; and a second electronic door chime identical to the electronic door chime;

wherein the electronic door chime, the second electronic door chime, and the external doorbell device are connected by a two-wire bus that carries the doorbell power and the doorbell trigger signal, wherein the electronic door chime and the second electronic door chime are activated by the same doorbell trigger signal;

wherein the dual voltage box is a UL certified two-gang dual voltage box;

wherein the doorbell interface is configured to provide no more than 24 VAC to the external doorbell device;

wherein the power supply is a transformer configured to provide no more than 24 VAC;

wherein the first DC output has a first DC voltage, wherein the second DC output has a second DC voltage, and wherein the first DC voltage is configured to be higher than the second DC voltage;

wherein the trigger sensed signal is optically isolated from the doorbell trigger signal;

the front cover being Acrylonitrile Butadiene Styrene and having a 2.2 mm minimum thickness, wherein a 1.5 mm thickness of the Acrylonitrile Butadiene Styrene has a UL 94 flame rating of at least V-0, a UL 746 RTI Electric rating of at least 80° C., a UL 746 RTI Impact rating of at least 80° C., and a UL 746 RTI Strength rating of at least 80° C.; and the back cover being Polycarbonate/Acrylonitrile Butadiene Styrene alloy and having the minimum thickness of 2.2 mm, wherein a 1.7 mm thickness of the Polycarbonate/Acrylonitrile Butadiene Styrene alloy has a UL 94 flame rating of at least V-2, a UL 746 RTI Electric rating of at least 60° C., a UL 746 RTI Impact rating of at least 60° C., and a UL 746 RTI Strength rating of at least 60° C.

13. A method comprising:

attaching a power supply to a back cover, the power supply configured to receive mains electric power and to produce an AC output;

attaching a first circuit powered by the AC output to the back cover, the first circuit comprising a power section, a doorbell interface, a doorbell sensor, and a chiming circuit;

forming a housing by attaching a front cover to the back cover, the back cover comprising a first compartment and a second compartment, the power supply in the first compartment, the first circuit in the second compartment, and the housing configured for installation in a two-gang dual voltage box;

producing a first DC output and a second DC output from the AC output, the first DC output and the second DC output configured to have different voltages;

continuously providing from the power section at least 18 VAC at 30VA or more to an external doorbell device that produces a doorbell trigger signal when a doorbell button is actuated;

continuously powering the doorbell sensor from the first DC output;

continuously powering the chiming circuit from the second DC output;

receiving the doorbell trigger signal;

sending a trigger sensed signal to the chiming circuit in response to receiving the doorbell trigger signal; and producing a sound wherein the chiming circuit sends a sound signal to a speaker held between the front cover and the first circuit to thereby cause the speaker to produce sounds.

14. The method of claim 13 wherein the doorbell interface is configured to provide no more than 24 VAC to the external doorbell device.

15. The method of claim 13 wherein the power supply is a transformer configured to provide no more than 24 VAC and no less than 18 VAC.

16. The method of claim 13 wherein the second DC output is produced by a converter powered by the first DC output.

17. The method of claim 13 wherein the trigger sensed signal is optically isolated from the doorbell trigger signal.

18. The method of claim 13 further comprising attaching a faceplate to the front cover, the faceplate configured to cover the housing when the housing is installed in the two-gang dual voltage box.

19. The method of claim 13 further comprising producing a rectified output from the AC output;

powering a light emitting diode from the rectified output only when a switch is open; and producing the doorbell trigger signal when the switch is closed.

20. An electronic door chime comprising:

a means for forming a housing comprising a first compartment and a second compartment, the housing configured for installation in a two-gang dual voltage box;

a means for producing an AC output from mains electric power, the AC output being no more than 24 VAC and no less than 18 VAC, the means for producing the AC output in the first compartment;

a means for producing a first DC output and a second DC output from the AC output, the means for producing the first DC output and the second DC output being in the second compartment;

a means for producing doorbell power configured for powering an external doorbell device by continuously providing at least 18 VAC at 30VA or more, the means for producing doorbell power being powered by the AC output;

a means for producing a trigger sensed signal, the means for producing the trigger sensed signal being continuously powered by the first DC output and in the second compartment, the trigger sensed signal optically isolated from a doorbell trigger signal provided by the external doorbell device, the trigger sensed signal being produced in response to receiving the doorbell trigger signal; and a means for producing a sound in response to receiving the trigger sensed signal, the means for producing the sound being continuously powered by the second DC output and in the second compartment.

* * * * *